INVENTORS
HAROLD W. ABBOTT,
VERNON P. MATHIS,
WILLIAM PEIL,

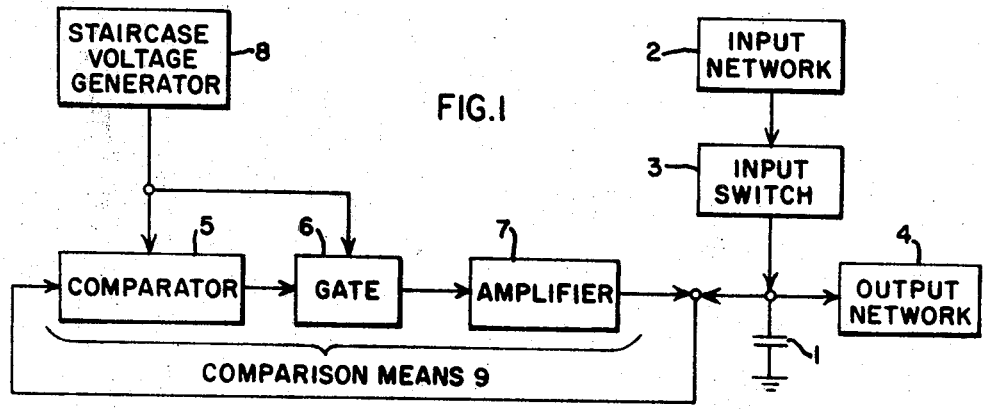
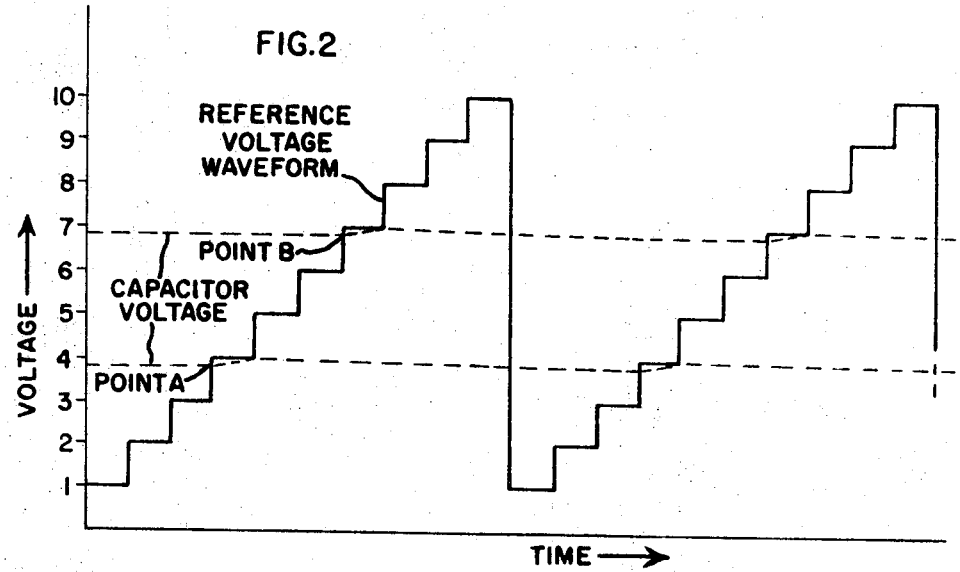
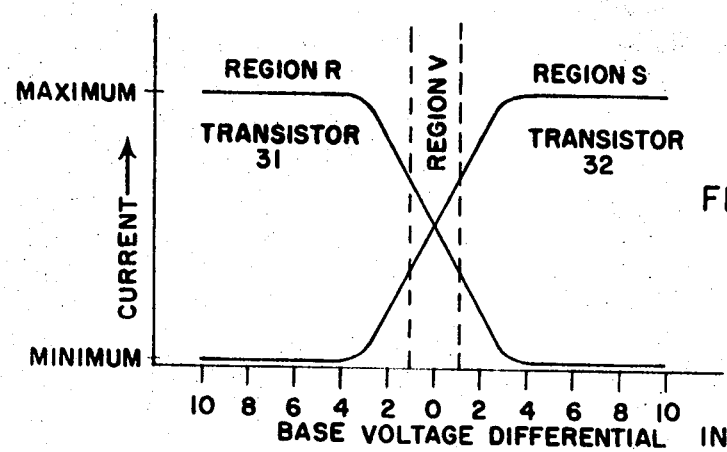
INVENTORS:
HAROLD W. ABBOTT,
VERNON P. MATHIS,
WILLIAM PEIL,
BY *Marvin L Edelberg*
THEIR ATTORNEY.

BY 3,546,561
CAPACITOR CHARGE REPLACEMENT CIRCUIT FOR MAINTAINING A STORED VOLTAGE
Harold W. Abbott, Syracuse, Vernon P. Mathis, Baldwinsville, and William Peil, Syracuse, N.Y., assignors to General Electric Company, a corporation of New York
Filed Jan. 4, 1968, Ser. No. 695,671
Int. Cl. H02j 1/00
U.S. Cl. 320—1           9 Claims

ABSTRACT OF THE DISCLOSURE

A circuit for maintaining charge across a capacitor at a predetermined level of voltage by periodically performing a comparison of the capacitor voltage with an incremental reference voltage and charging the capacitor to the closest voltage increment as a function of the difference between the capacitor and reference voltages. A staircase generator of discrete voltage steps is contemplated as the reference voltage source, the circuit responding to adjust charge on the capacitor only when the closest voltage increment is reached. In one embodiment of the invention the reference voltage source is free running and can be readily employed for a parallel operation of plural capacitors having stored voltage levels within the voltage range swept by said source. In a second embodiment, the reference voltage source is reset upon the capacitor level being reached, which may be desirable when only a single capacitor is employed or for a sequential operation of plural capacitors.

BACKGROUND OF THE INVENTION

Field of the invention

The invention relates generally to the field of storage circuits wherein information in either analog or digital form is required to be stored for an extended period of time. More particularly, the invention concerns the use of capacitors as the storage components.

Description of the prior art

More storage circuits known to the art capable of providing permanent information storage in response to an electrical input are of a digital type, not suitable for operating directly on analog information. The most common of these include shift registers and magnetic storage circuits of the core or film type. In addition, diode capacitor circuits have been employed for digital information where less stringent storage requirements exist. For many applications, it is desirable to receive and store information that is of an analog type, without the necessity for converting such information to digital form. At present, there is no suitable non-mechanical, electrically responsive means for storing analog information for long periods of time. Storage capacitors connected to a high impedance load are often employed for holding analog information, but for relatively brief periods. Their use as a storage device is dependent upon capacitor size and leakage currents, and definite limitations are placed upon storage time.

Where there is a requirement to receive and store analog information on a relatively permanent basis, it is commonly done by the mechanical adjustment of a potentiometer from which is taken a voltage proportional to the analog value. Such mechanical operation has obvious limitations.

SUMMARY OF THE INVENTION

It is a principal object of the invention to provide novel circuit means for receiving either analog or digital information in electrical form and for storing same within well defined limits for an indefinite period of time.

It is a further object of the invention to provide a novel storage capacitor circuit to which charge that is indicative of either analog or digital information may be applied and permanently maintained within precisely defined limits.

It is another object of the invention to provide circuit means for permanent storage of analog information which does not require any form of mechanical adjustment.

It is still another object of the invention to provide a novel capacitor charge replacement circuit for maintaining charge across a capacitor by periodically replenishing small amounts of charge lost through leakage currents.

It is a further object of the invention to provide a novel capacitor charge replacement circuit as described which automatically adjusts to different quantities of charge to be stored by the capacitor.

It is yet another object of the invention to provide a capacitor charge replacement circuit as above described for maintaining charge across a plurality of capacitors which may store different quantities of charge.

It is yet a further object of the invention to provide a charge replacement circuit as described which is of a relatively simple configuration and can be fabricated in microminiature form.

These and other objects of the invention are accomplished by a capacitor charge replacement circuit which includes principally an incremental reference voltage source the steps of which cover a range containing the level of voltage to be stored by a storage capacitor, a comparator means for generating a signal that is a function of the difference between the reference and capacitor voltages, and means selectively responsive to the signal from the comparator means for charging the capacitor so as to compensate for leakage currents during the condition in which the difference voltage is within a fraction of a single increment of the reference voltage.

In accordance with a further aspect of the invention, a reset signal is generated by the comparator means for resetting the reference voltage source to its initial value upon the capacitor charging.

In accordance with yet another aspect of the invention individual voltage levels are maintained across a plurality of capacitors in either a sequential or parallel operation.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

FIG. 1 is a block diagram of a capacitor charge replacement circuit in accordance with one embodiment of the invention;

FIG. 2 presents a graph employed in an explanation of the circuit of FIG. 1;

FIG. 4 presents a graph employed in an explanation of the circuit of FIG. 3;

DESCRIPTION OF THE PREFERRED EMBODIMENTS

Figure 3:
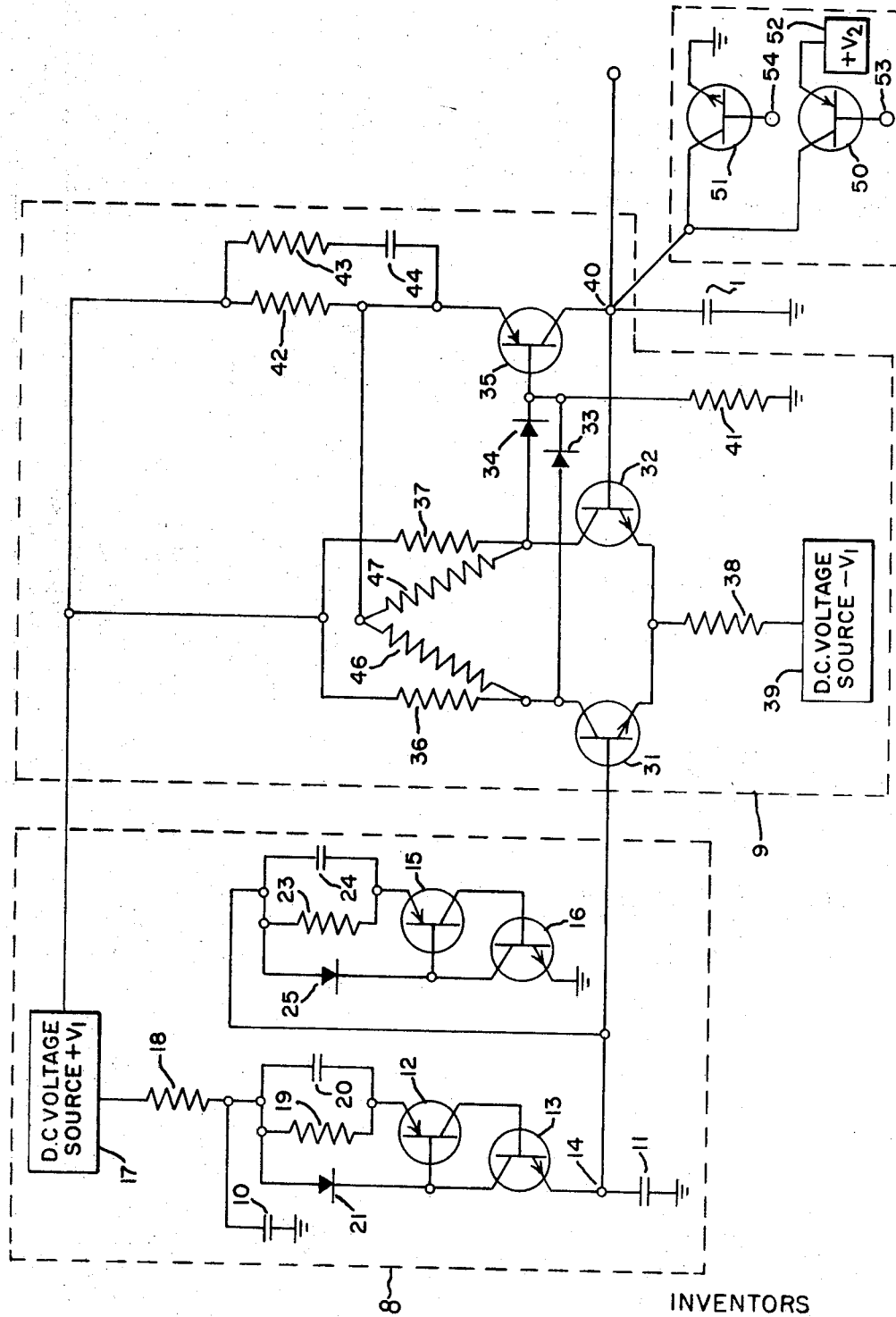
FIG. 3 is a schematic circuit diagram corresponding to the block diagram of FIG. 1.

A capacitor charge replacement circuit for maintaining a given level of voltage across a storage capacitor 1 is illustrated, in accordance with one embodiment of the invention, in the block diagram of FIG. 1. The stored charge is supplied by an input network 2 which may include a conventional voltage or current source. The supplied charge may be indicative of either an analog or a digital information, typically providing a control function or representing sampled information. Network 2 is connected to capacitor 1 in some given manner, schematically illustrated as being through an input switch 3, which in practice will normally be an electronic component. Capacitor 1 is coupled to an output network 4 that may be a conventional circuit for utilizing or responding to the stored voltage, in the process producing unavoidable leakage currents.

The charge replacement circuit includes a voltage comparator component 5, a gate network 6, an amplifier 7 and an incremental reference voltage source 8. Components 5, 6 and 7 may be considered together as a comparison means 9. Source 8 is preferably a staircase voltage generator that successively generates a plurality of discrete voltage levels over a range which includes the voltage level stored by capacitor 1. It is noted that for purposes of the invention source 8 might generate discrete level waveforms other than a staircase configuration. In the embodiment of FIG. 1, generator 8 is free running and cylically repeats its staircase waveform at a given frequency. Its output, together with the voltage across capacitor 1, is connected to the comparator 5 which produces a signal that is a function of the difference between the capacitor voltage and the applied reference voltage.

The signal from comparator 5 is coupled to gating means 6 as is the voltage generated by source 8. In response to the applied voltages, gating network 6 is opened to pass the signal from the comparator only for a single level of the reference voltage, which corresponds to the voltage being stored by the capacitor 1. The output of gate 6 is connected through amplifier 7 for recharging the capacitor in compensation for the leakage currents. The circuit acts to automatically maintain a given level of voltage applied from network 2 across the capacitor 1 to approximately the nearest increment of the reference voltage generated by the source 8.

Considering an example operation of the circuit, a staircase voltage waveform may be generated by the source 8 having steps 1 through 10 extending uniformly over a given voltage range. as shown in the graph of FIG. 2. In practice the number of steps will normally be about an order of magnitude greater. It may be assumed that for a first operation, voltage is to be maintained across capacitor 1 corresponding to level 4 of the reference voltage, and that the charge across the capacitor provides either a measure of voltage per se or an integrated current supplied from the input network 2. Leakage currents associated with the output network 4 tend to discharge the capacitor 1, for example, to point A slightly below level 4, as shown in FIG. 2. The charge replacement circuit is adjusted so as to recurringly replace the lost charge.

As the staircase voltage proceeds through levels 1 through 3, the gate 6 is closed. Upon level 4 being reached the gate opens and the signal generated by the comparator 5, a function of the difference between the capacitor voltage and the reference voltage at level 4, is supplied to amplifier 7. This signal is amplified and employed to charge the capacitor so as to return its voltage to its initial value corresponding to level 4. In the embodiment of FIG. 3 it will be seen that the initial capacitor voltage is necessarily slightly higher than the reference voltage level. When the voltage generator steps to level 5, as well as for the succeeding steps 6 through 10, the gate 6 is again closed. If in a second operation it is assumed that capacitor 1 is changed to a second level by means of input network 2 and switch 3, for example to level 7, the gate network 6 will then open only upon the staircase voltage reaching level 7 and the capacitor will be maintained between a voltage corresponding to this level and point B, just below.

In FIG. 3 there is shown a schematic circuit diagram of a capacitor charge replacement circuit generally corresponding to the block outline of FIG. 1. The staircase voltage generator 8 is shown as a semiconductor circuit including a first small capacitor 10 which controls the charging of a second larger capacitor 11 through transistors 12 and 13 connected as a PNPN switch to provide a staircase voltage waveform at terminal 14. When reaching a voltage level corresponding to the final step of the waveform capacitor 11 is discharged to ground through transistors 15 and 16, also connected as a PNPN switch.

A D.C. source 17 of positive voltage $+V_1$ is connected through a current limiting resistor 18 to the ungrounded terminal of capacitor 10. It is further connected through the shunt path of a resistor 19 and a capacitor 20 to the emitter electrode of transistor 12 and through a diode 21 to the base electrode of transistor 12, said diode being poled to conduct current in the easy direction toward said base electrode. The base of transistor 12 is connected to the collector of transistor 13. The collector of transistor 12 is connected to the base of transistor 13, and the emitter thereof is connected to the ungrounded terminal 14 of capacitor 11. Capacitor 11 is also connected through a shunt connection of resistor 23 and capacitor 24 to the emitter electrode of transistor 15, and through diode 25, poled as diode 21, to the base of transistor 15. The base of transistor 15 is connected to the collector of transistor 16. The collector of transistor 15 is connected to the base of transistor 16, and the emitter of transistor 16 is connected to ground.

In operation of the staircase generator 8, capacitor 10 is initially charged by source 17 to a given voltage level. Transistors 12 and 13, operating as a switch, are thereupon triggered so as to discharge capacitor 10 and charge capacitor 11 to a voltage equal to a single increment of the staircase waveform. Since capacitor 11 is much larger than capacitor 10, its increased voltage is a small fraction of the voltage developed across capacitor 10. When capacitor 10 discharges sufficiently transistors 12 and 13 become nonconducting and capacitor 11 ceases to charge. Capacitor 10 then again charges, transistors 12 and 13 are triggered, and the process is repeated to thereby generate the staircase waveform.

In FIG. 3 the comparator, gate and amplifier components of FIG. 1 are shown combined in a single network as the comparison means 9. Included are a pair of transistors 31 and 32 operated as a differential amplifier and which perform a comparison function, a pair of diodes 33 and 34 which perform a gating function and a driver transistor 35 that directs charge into the capacitor 1. The D.C. voltage source 17 is connected to the collector electrodes of transistors 31, 32 through a pair of bias resistors 36 and 37, respectively. The emitter electrodes are connected through a common bias resistor 38 to a D.C. voltage source 39 of negative potential $-V_1$. Terminal 14 of reference voltage generator 8 is connected to the base electrode of transistor 31, and the ungrounded terminal 40 of storage capacitor 1 is connected to the base of transistor 32. The collector electrodes of transistor 32. The collector electrodes of transistors 31 and 32 are connected by diodes 33 and 34, respectively, to the base electrode of transistor 35, said base being further connected through a bias resistor 41 to ground. Diodes 33 and 34 are poled to conduct current in the easy direction towards the base of transistor 35. D.C. source 17 is connected through a bias resistor 42 in shunt with the serial connection of a current limiting resistor 43 and a D.C. blocking capacitor 44 to the emitter electrode of transistor 35, the collector of which is connected to terminal 40. The emitter of transistor 35 is also connected through a pair of bias resistors 46 and 47 to the collectors of transistors 31 and 32, respectively, which act to improve the sensitivity of the transistor 35 operation.

The input network and switch are combined and include transistors 50 and 51 for raising or lowering the voltage across capacitor 1. Accordingly, terminal 40 is connected to the collector electrodes of said transistors. The emitter of transistor 50 is connected to source 52 of positive D.C. voltage $+V_2$ and the emitter of transistor 51 is connected to ground. Input terminals 53 and 54 are connected to the base electrodes of transistors 50 and 51, respectively.

In the operation of the comparison means 9, the transistors 31 and 32 perform a differential amplifier function and steer a relatively fixed amount of current from one transistor to the other as a function of the difference in signals applied to their base electrodes. This operation is illustrated by the graph of FIG. 4. Accordingly, for application of the staircase voltage to transistor 31 at voltage levels grossly less than the stored voltage on capacitor 1, operation will be in the region S of the graph of FIG. 4 wherein transistor 32 conducts considerably harder than transistor 31. The voltage at the collector of transistor 31 is coupled through diode 33 so as to bias transistor 35 in the OFF condition. Transistor 35 operates as a switch that conducts in accordance with the magnitude of bias signals below a given threshold value, cutting off sharply at threshold. When the staircase voltage reaches a level that is within a fraction of a step of the stored voltage across the capacitor, operation of the transistors 31 and 32 is brought into the region U of the graph of FIG. 4, wherein both transistors are partially conductive. The bias signal to the transistor 35 is reduced below threshold and the transistor conducts charge current with a magnitude that is a function of the difference between the capacitor voltage and reference voltage. Storage capacitor 1 accordingly charges to its initial value. Upon the staircase voltage stepping to the next higher level, operation in region R commences wherein transistor 31 conducts much harder than transistor 32 and the collector voltage at transistor 32, which exceeds the threshold of transistor 35, is coupled through diode 34 for turning transistor 35 OFF. Operation continues in region R for the remainder of the staircase steps, returning to region S upon commencement of the next cycle of the staircase, and the process is repeated.

Regarding specifically the operation of the differential amplifier and referring to FIG. 4, it is seen that at 0 base voltage differential of the transistors 31 and 32, which will be termed the balance point, current conducts equally in the transistors. A stable operation of the circuit requires that the storage capacitor 1 charge to a voltage corresponding to an operation of the differential amplifier slightly above the balance point, i.e., where the transistor 32 conducts more than transistor 31. However, the charge process may begin either from a point below or above the balance point. For a charge operation entirely above the balance point, the charge current decreases as a function of time. For a charge operation which runs through the balance point, the charge current, as a function of time, first increases as the capacitor voltage approaches the balance point, and then decreases. It is noted that in stepping to next higher level of the staircase voltage following the charge function, the balance point will be again traversed but with great rapidity, tending to produce a small burst of charge. Accordingly, it is a constraint of the circuit that the rise time between levels of reference voltage is sufficiently short so that the burst of charge supplied during this transient period is less than the leakage charge of capacitor 1 per each cycle of the reference voltage.

The ability of the circuit to maintain the capacitor voltage constant to within a small degree, typically on the order of several millivolts, depends primarily upon the accuracy with which the discrete steps of the reference voltage can be generated and the response sensitivity of the differential amplifier transistors 31, 32 and the driver transistor 35. It also depends upon having an adequate source of charge current and a frequency of the reference voltage source.

The following circuit components and parameters are indicated for one specific embodiment of the circuit of FIG. 3, these being given as example and not to be construed as limiting:

Staircase voltage generator 8—10-volt range, 100 steps frequency from 30–3 kHz.

Capacitors:
    1—50 μfd.
    10—.005 μfd.
    11—.5 μfd.
    20, 24—.1 μfd.
    44—6 μfd.

Resistors:
    18—22K ohms
    19, 23—100 ohms
    36, 37, 46, 47—50K ohms
    38—82K ohms
    41—1 megohm
    43—1K ohm Transistors:
    12, 15, 35, 50—Type 2N3638
    13, 16—Type 2N2714 (inverted connection of emitter and collector)
    31, 32, 51—Type 2N2714

Diodes 21, 25, 33, 34—Type 1N914

DC voltage source:
    17—+22 volts
    39—−22 volts
    52—+1–10 volts

Figure 5:
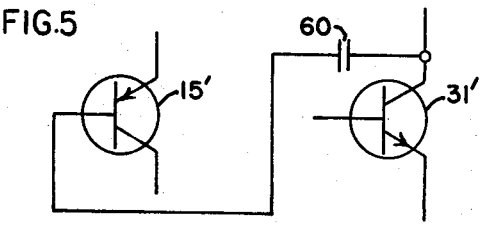
FIG. 5 illustrates a modification of a portion of the circuit of FIG. 3.

In FIG. 5 there is illustrated a modified capacitive connection that may be employed in the circuit of FIG. 3 for resetting the staircase generator immediately upon exceeding the level which puts charge into the storage capacitor 1. As shown in FIG. 5 the collector of transistor 31' which corresponds to transistor 31 in FIG. 3, is connected through a coupling capacitor 60 to the base of transistor 15', corresponding to transistor 15 in FIG. 3. The modified connection operates to transmit a negative spike to the base of transistor 15' upon transistor 31' abruptly becoming fully conducting. In turn, the PNPN switch which includes transistor 15' closes and causes the large capacitor of the staircase generator to discharge. The modified circuit connection is useful where only a single capacitor is to be charged at one time, providing a more efficient operation.

Figure 6:
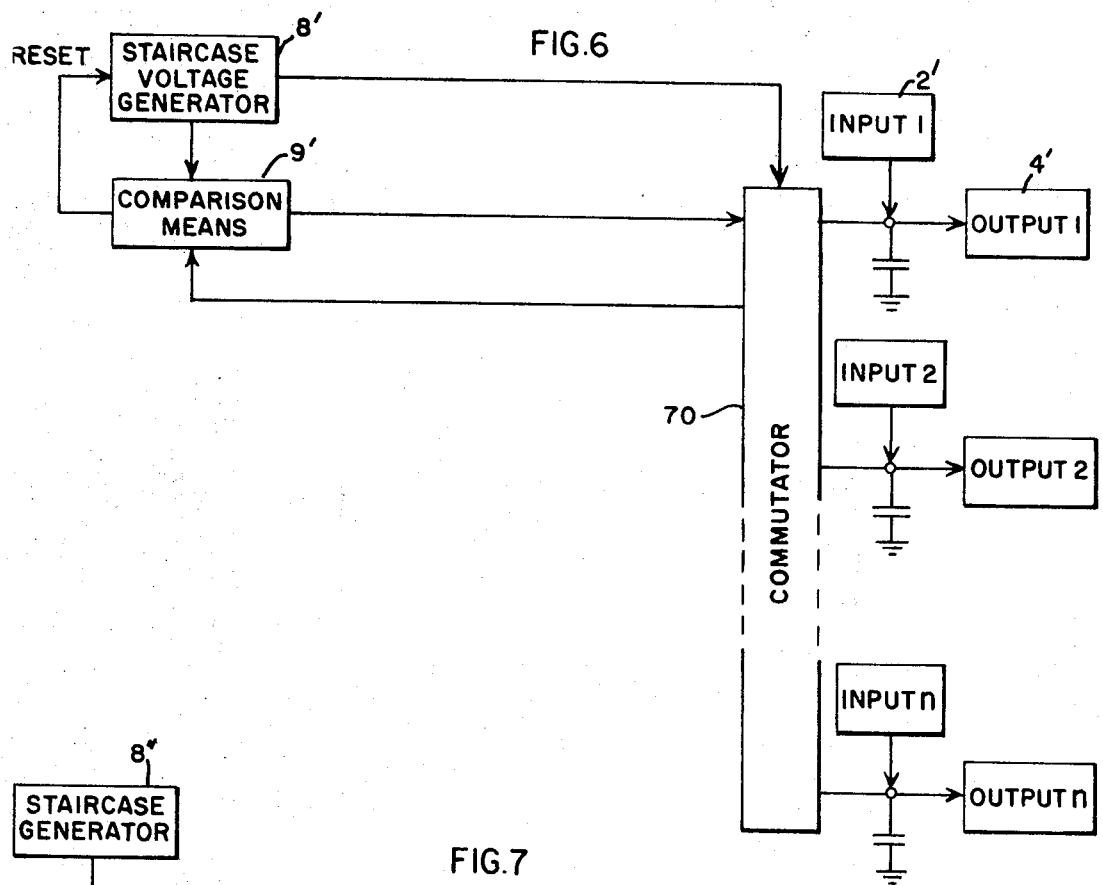
FIG. 6 is a block diagram of a capacitor charge replacement circuit in accordance with a further embodiment of the invention wherein a single charge replacement circuit is employed to maintain the voltages across a plurality of capacitors in a sequential operation.

In FIG. 6 there is shown a block diagram of a charge replacement circuit similar to that of FIG. 1, which circuit is employed to maintain different level voltages across a plurality of storage capacitors. The blocks corresponding to those of FIG. 1 are identified by the same reference characters, but with an added prime notation. A commutating network 70 acts as an interface between the storage capacitors and the charge replacement circuit and by means of conventional circuitry provides a sequential connection of said capacitors to the comparison means 9'. Accordingly, the staircase generator 8' is connected to the comparison means as previously and is further connected to the commutator 70 for stepping its operation once for each excursion of the staircase waveform. Conveniently, the connection to the commutator could be taken through a coupling capacitor from the output terminal of generator 8'. A connection is made from the output of the comparison means through the commutator to each of the storage capacitors, and from the capacitors through the commutator to the input of the comparison means. A further connection is made from the comparison means 9' to the staircase generator 8' for resetting the generator in accordance with the modified embodiment of FIG. 5. It may be appreciated that the resetting function need not be included. Input networks 2' providing inputs 1 through $n$ and output networks 4' providing outputs 1 through $n$ are connected to each of the storage capacitors in a manner similar to that previously described.

Figure 7:
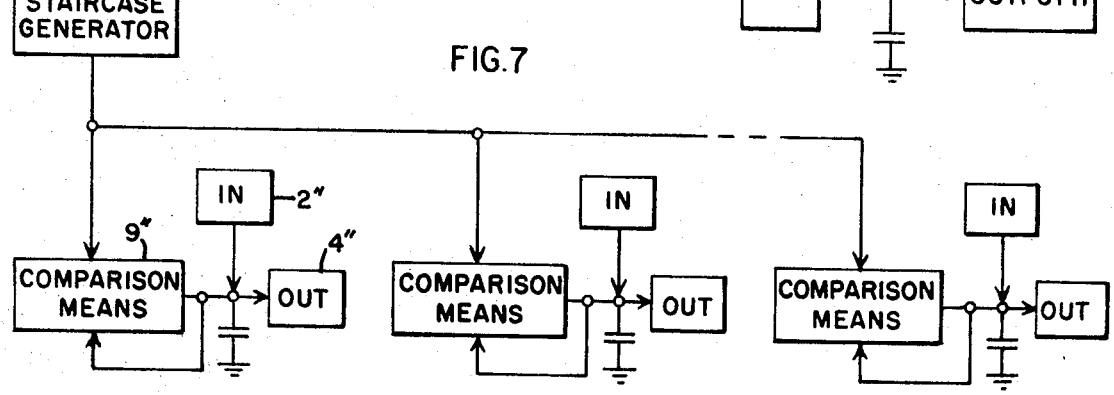
FIG. 7 is a block diagram of a further embodiment of the invention wherein a single reference voltage source is employed to maintain the voltages across a plurality of capacitors in a parallel operation.

In FIG. 7 there is illustrated a block diagram of still a further embodiment of the invention wherein a plurality of storage capacitors are operated in a parallel manner. Similar reference characters to FIG. 1 are employed, but with an added double prime notation. For this embodiment each of the capacitors has its own comparison means 9" to which a common reference voltage source 8" is connected. The capacitors may each have a different voltage stored thereacross from input networks 2" providing inputs 1 through $n$, within the limits of the reference voltage, and supplying outputs 1 through $n$ in output networks 4'. The operation is otherwise the same as previously discussed.

It may be appreciated that numerous modifications and variations may be made to the disclosed circuit which do not exceed the teachings set forth herein. The appended claims are intended to include within their meaning all such differences that reasonably fall within the true scope of the invention.

What we claim as new and desire to secure by Letters Patent of the United States is:

1. A charge replacement circuit for maintaining a given stored voltage across a capacitor, comprising
    (a) an incremental reference voltage source for successively generating voltages of discretely different voltage levels within an established voltage range, one level of which corresponds to said stored voltage,
    (b) comparator means responsive to the application of voltages from said reference source and capacitor for generating a signal that continuously varies as a function of the difference between the applied voltages when they correspond to within a fraction of a single voltage level of said reference source, and
    (c) further means selectively responsive to said signal for adjusting the charge on said capacitor.

2. A charge replacement circuit as in claim 1 wherein said further means includes charging means coupled to said capacitor and gating means for activating said charging means in response to corresponding voltages applied to said comparator means and for inactivating said charging means in response to noncorresponding voltages applied to said comparator means.

3. A charge replacement circuit as in claim 2 which includes an input network for changing the voltage stored by said capacitor.

4. A charge replacement circuit as in claim 3 wherein said reference source is a staircase voltage generator that has a finite number of steps and is cyclically repetitive.

5. A charge replacement circuit as in claim 4 which includes means for resetting said voltage generator upon the charge on said capacitor becoming adjusted.

6. A charge replacement circuit as in claim 5 wherein a plurality of capacitors may have different voltages maintained thereacross, which includes a commutator means for sequentially connecting each capacitor to said comparator means and said charging means in response to the resetting of said voltage generator.

7. A charge replacement circuit as in claim 4 wherein a plurality of capacitors may have different voltages maintained thereacross, which includes a comparator, gating and charging means for each capacitor, said staircase voltage generator being applied by a parallel connection to each of said comparator means.

8. A charge replacement circuit as in claim 2 wherein said comparator means includes a differential amplifier having a pair of input electrodes and a pair of output electrodes, said voltage source and said capacitor being coupled to each said input electrodes, respectively, for providing a voltage response at said output electrodes that is a function of the difference between the voltages at said input electrodes.

9. A charge replacement circuit as in claim 8 wherein said gating means includes a pair of semiconductor diodes and said charging means includes a transistor amplifier having an input electrode and an output electrode, the output electrode of said transistor amplifier being connected to said capacitor, and said diodes connecting the output electrodes, respectively, of said differential amplifier to the input electrode of said transistor amplifier.

References Cited
UNITED STATES PATENTS

| | | | |
|---|---|---|---|
| 3,351,837 | 11/1967 | Owen | 320—1 |
| 3,390,381 | 6/1968 | Shepard | 320—1X |

TERRELL W. FEARS, Primary Examiner

U.S. Cl. X.R.

321—16